June 17, 1924.
B. SCHERER
HEADLIGHT
Filed Jan. 9, 1923
1,498,484
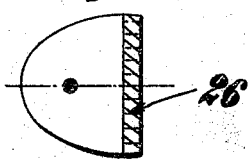
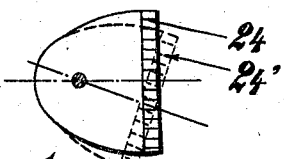
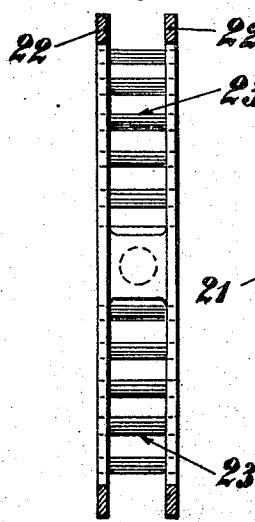
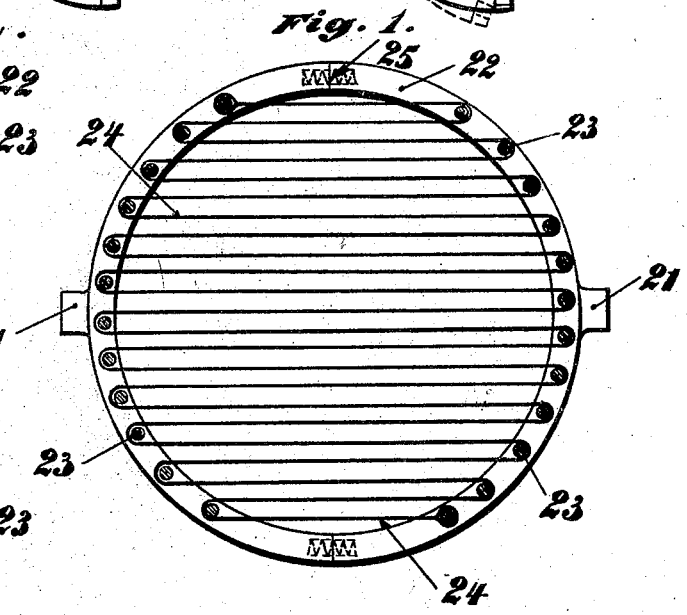

Patented June 17, 1924.

1,498,484

UNITED STATES PATENT OFFICE.

BENOIT SCHERER, OF COURBEVOIE, FRANCE.

HEADLIGHT.

Application filed January 9, 1923. Serial No. 611,614.

*To all whom it may concern:*

Be it known that I, BENOIT SCHERER, a citizen of the Republic of Switzerland, residing in Courbevoie, in the Republic of France, have invented certain new and useful Improvements in Headlights, of which the following is a specification.

This invention relates to improvements in head-lights and more particularly to a device for preventing the dazzle of the beam thereof.

The object of the present invention is to provide a device applicable to the head lights of vehicles which enables the ground in front of the vehicle to be illuminated but prevents the light having a dazzling effect on an observer coming in the opposite direction.

In the accompanying drawings which represent various examples of carrying out the arrangements for directing the beam according to this invention;

Figs. 1 and 2 are respectively a front view and a vertical section of an arrangement intended to be applied to the head lights of motor vehicles.

Figs. 3 and 4 are diagrammatic views of modifications.

In accordance with my invention, for the arrangement of screens attached to an oscillating frame there may be provided, as indicated in Figs. 1 and 2, two parallel annular frames 22 connected by pins or trunnions 23 over which is stretched a band in one or more lengths or even an endless band 24, the said bands being of any suitable material such as for instance paper or a suitable fabric of sufficient resistance, the frames having preferably an automatic tension arrangement formed for example by springs 25 or other suitable arrangement. In this form of construction trunnions 21 are also provided for the support of the unit formed by the two frames 22 so as to allow of the whole arrangement to be moved about these trunnions in order to bring the band 24 into a horizontal position or an inclined position.

For this latter form of construction in particular, it may be advantageous to render the whole of the two frames 22 firmly connected with the corresponding head light and to provide the latter with an arrangement which enables it to be suitably inclined. The arrangement shown diagrammatically in Fig. 11 is thereby obtained, which shows in full lines the position occupied by the head light for the normal lighting of the track, and in dotted lines (exaggerated) the same head light in the position which it must occupy for example, when the vehicle is passing through a crowd to veil the dazzling light of the head light whilst lighting up the road. In this arrangement for the normal position of the head lights the strips occupy a horizontal direction as shown in full lines in Fig. 4 and do not in any way obstruct the passage of the beams emitted by the source of light for the distant lighting of the road. When it is desired to cut out the dazzling effect produced by the light of the head light the latter is brought into the position shown in dotted lines in Fig. 4 by causing it to pivot about a suitable fixed point so that the strips, for example 24, are inclined out of the horizontal as shown in dotted lines at 24', and only allow the beams to pass at their inclination. The result is a lighting of the road in front of the vehicle without any dazzle effect seeing that the beam is directed on to the road in front of the vehicle without any emission in a horizontal direction.

Instead of providing in front of the luminous source of each head light, a screen adapted to oscillate about a horizontal axis, the dazzling of the head lights may be prevented as shown diagrammatically at 26 in Fig. 3 which is thus suppressed in a permanent manner and the beams only serve to constantly light the road to a certain distance immediately in front of the vehicle.

Each head light may also be mounted, or the frame supporting the screen on suitable fixed or movable supports, allowing the beam to assume any suitable direction in front of the vehicle according to requirements.

I declare that what I claim is:—

A blinder for an automobile headlight comprising an adjustable screen, a frame receiving the screen and comprising two annular frame members, controlling springs between said frame members, bolts uniting the parts of the frame members, and the said screen being formed by a band arranged in zigzag formation over the said connecting bolts, said band consisting of resilient material and being permanently tensioned against the parts of the frame by the action of the said springs.

In witness whereof, I have hereunto signed my name this 12 day of December, 1922, in the presence of two subscribing witnesses.

BENOIT SCHERER.

Witnesses:
L. PARETTE,
F. J. HAES.